United States Patent [19]

Pflüger

[11] Patent Number: 4,940,216

[45] Date of Patent: Jul. 10, 1990

[54] MACHINIST'S VISE

[75] Inventor: Ludwig Pflüger, Bitburg/Mötsch, Fed. Rep. of Germany

[73] Assignee: Carl U. Peddinghaus, Wuppertal-Barmen, Fed. Rep. of Germany

[21] Appl. No.: 247,109

[22] Filed: Sep. 20, 1988

[30] Foreign Application Priority Data

Sep. 30, 1987 [DE] Fed. Rep. of Germany ....... 3732900

[51] Int. Cl.[5] ............................................ B23Q 3/08

[52] U.S. Cl. ........................................ 269/32; 269/24; 269/27

[58] Field of Search ........................ 269/24, 25, 27, 32; 74/71, 74, 105; 192/93 C, 93 R, 95

[56] References Cited

U.S. PATENT DOCUMENTS 2,472,783 6/1949 Barrice ................................ 192/93

3,147,002 9/1964 Arnold ................................ 269/24

FOREIGN PATENT DOCUMENTS 2051119 1/1979 Fed. Rep. of Germany .

*Primary Examiner*—Judy Hartman

*Attorney, Agent, or Firm*—Herbert Dubno

[57] ABSTRACT

A vise has a stationary jaw, a movable jaw displaceable longitudinally toward and away from the stationary jaw, an outer hollow high-speed spindle threaded in a nut on the fixed jaw and formed with a radially open entrainment recess, and an inner low-speed spindle threaded in the outer spindle. A piston-and-cylinder unit on the movable jaw has primary and secondary pistons respectively engaged by the outer and inner spindles. A hand crank is rotationally fixed on the inner spindle and an entrainment pin is displaceable transversely in the inner spindle between an entrainment position engaged in the recess and rotationally coupling the inner and outer spindles to each other and a freeing position clear of the recess and permitting relative rotation of the inner and outer spindles. This entrainment pin is formed with a longitudinally directed camming surface. A switching piece displaceable on the inner spindle between a high-speed position and a low-speed position can operate a bolt displaceable along the inner spindle and engageable with the entrainment pin and with the switching piece for pressing the operating bolt into the camming surface in the low-speed position of the switching piece and thereby pulling the entrainment pin out of the recess to decouple the spindles and for freeing the operating bolt from the camming surface and coupling the spindles to each other in the high-speed position of the switching piece.

6 Claims, 3 Drawing Sheets

MACHINIST'S VISE

FIELD OF THE INVENTION

My present invention relates to a clamping apparatus or mechanism and, more particularly, to a machinist's vise.

BACKGROUND OF THE INVENTION

A clamping apparatus, especially a machinist's vise, is known comprising a stationary clamping piece or jaw, a movable clamping piece or jaw, a clamping piston-cylinder unit with a primary piston and a secondary piston, and a hand crank drive.

In this clamping apparatus the hand crank drive has a hollow high-speed spindle and a hollow low-speed operating spindle for the clamping piston-cylinder unit located in the movable clamping piece.

The high-speed spindle is guided in a spindle nut of the stationary clamping piece. A push rod is guided in the hollow high-speed spindle. The low-speed operating spindle acts upon the hollow high-speed spindle and is guided therein. A hand crank drive engages the operating spindle. A coupling mechanism or clutch is arranged between the high-speed spindle and the operating spindle. It engages when driving the high-speed spindle and is disengaged when operating the clamping piston-cylinder unit.

In the known clamping apparatus (German published patent application No. 20 51 119) the coupling mechanism is a torque clutch of suitable structure with a loading spring and coupling components connected to each other by frictional contact. That is expensive. The torque clutch in toto is a comparatively small unit because it must be accommodated in the operating spindle. It is thus susceptible to trouble at high operating loads.

OBJECT OF THE INVENTION

It is an object of my invention to provide an improved clamping apparatus or vise with a simple operationally reliable clutch which can be accommodated directly in an operating spindle of reduced diameter.

SUMMARY OF THE INVENTION

According to my invention the coupling mechanism or clutch comprises a transverse entraining pin, a positioning bolt for the transverse entraining pin loaded by a return spring and a transversely shifting piece mounted in the low-speed operating spindle. An entraining pin recess in the high-speed spindle is associated with the transverse entraining pin. The pin is forced into the entraining pin recess by engagement of the positioning bolt in a positioning cavity provided with a positioning surface. The positioning bolt is forcible by the transversely shifting piece into the positioning cavity. The transversely shifting piece has an engaged position and a disengaged position.

Generally the engaged position and the disengaged position of the transversely shifting piece can be held by means of a locking mechanism. The transverse entraining pin can be provided with a return spring for moving the pin from the entraining pin recess when the pin is not acted on by the positioning bolt.

One advantageous embodiment of my invention is characterized by the transverse entraining pin having a controlling bevelled surface. The entraining pin can be moved from the entraining pin recess by this surface when the transversely shifting piece is positioned in the disengaged position on operation of the operating spindle.

An advantage of my invention is that the clamping apparatus according to my invention can operate with a very simple and reliable coupling or clutch. The clutch is equipped so that it is completely operationally reliable with simple components which can be accommodated easily in the operating spindle and can operate a long operating life without trouble.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
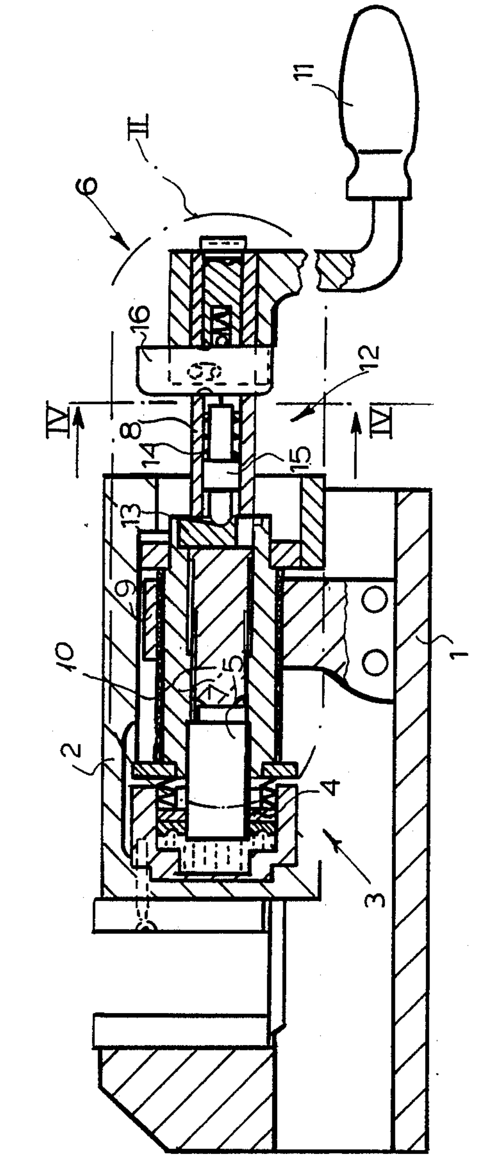
FIG. 1 is a longitudinal cross-sectional view through a clamping apparatus according to my invention which in this example is a vise.

The clamping apparatus shown in the drawing is a machinists' vise. It comprises basically a fixed clamping piece or jaw 1, a movable clamping piece or jaw 2, a clamping piston—cylinder unit 3 with a primary piston 4 and a secondary piston 5 as well as a hand crank drive 6.

The hand crank drive 6 includes a hollow high-speed outer spindle 7 and a hollow low-speed operating inner spindle 8. The clamping piston-cylinder unit 3 is mounted within the movable clamping piece 2 and, more specifically, is at least partially surrounded by the hollow high-speed spindle 7. A spindle nut 9 attached to the stationary clamping piece 1 serves as a guide for and partially encompasses the high-speed spindle 7.

A hand crank 11 which is part of the hand crank drive 6 is carried on the low-speed operating spindle 8. In turn, the operating spindle 8 acts upon a transverse entraining pin 13. Thereupon force is transferred from entraining pin 13 to a push rod 10, the entraining pin and push rod 10 being each at least partially within the hollow high-speed spindle 7.

Figure 2:
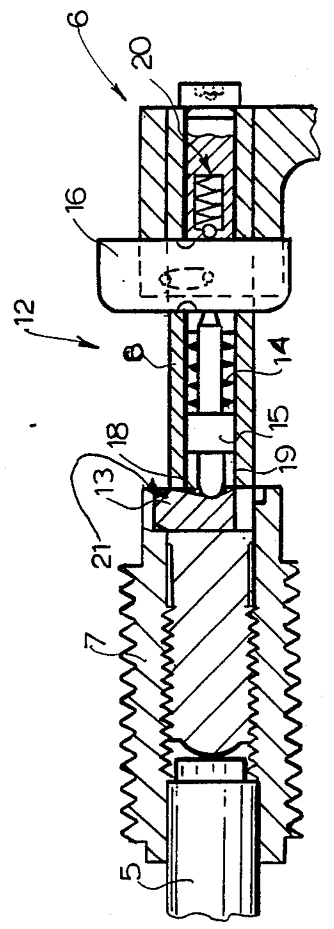
FIG. 2 is a detailed cross sectional view of the portion II of the apparatus shown in FIG. 1 in the dot-dashed oval with the transversely shifting piece in the engaged position.
Figure 3:
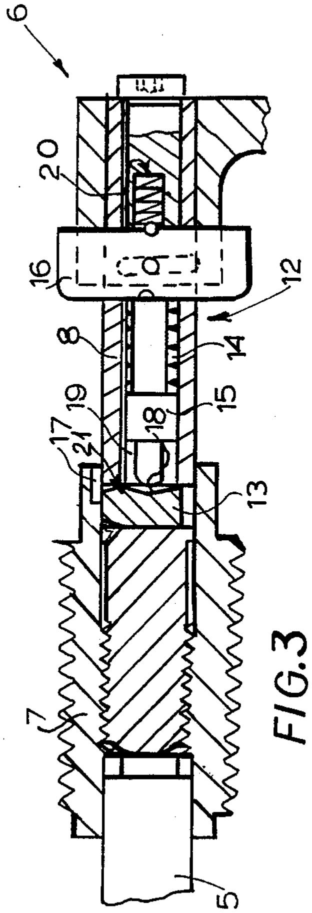
FIG. 3 is a detailed cross sectional view of the device shown in FIG. 2 in another operating configuration with the transversely shift in the disengaged position.
Figure 4:
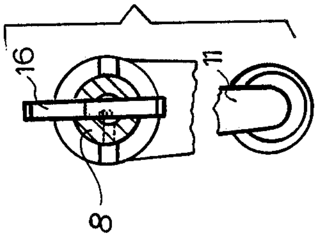
FIG. 4 is a cross sectional view through the apparatus taken along the section line IV—IV of FIG. 1 in the direction of the arrows.

A clutch or coupling mechanism 12 is provided within the hollow operating spindle 8. In a first position of the clutch 12, as illustrated in FIG. 2, the transverse entraining pin 13 engages in the high-speed spindle 7 and thereby couples the spindles 7 and 8 together for joint rotation and joint axial movement of the pistons 4 and 5. FIG. 3 illustrates a second position of the clutch 12 wherein the outer spindle 7 is disengaged from the transverse entraining pin 13 and the inner spindle and its piston 5 can move inside the outer spindle 8 and its position 4 for low-speed high-pressure movement of the jaw 2. With this arrangement the operating spindle 8 acts upon the transverse entraining pin 13 which, in turn, operates the clamping piston-cylinder unit 3 allowing movement of the vise jaws 1 and 2.

A comparison of FIGS. 2 and 3 shows that the clutch 12 comprises the transverse entraining pin 13, a positioning bolt 15 loaded by a return spring 14 and a transversely shifting piece 16. Mounted within the operating spindle 8 is a major portion of the shifting piece 16. The transverse entraining pin 13 is associated with an entraining pin recess 17 in the high-speed spindle 7.

The transverse entraining pin 13 is forcible into the entraining pin recess 17 by forcing the positioning bolt 15 into a positioning cavity 19 provided with a positioning surface 18.

The positioning bolt 15 is forcible into the positioning cavity 19 by the transversely shifting piece 16 which in turn has an engaged and a disengaged position which are seen from comparison of FIGS. 2 and 3. Engagement and disengagement may readily be achieved by pressing the shifting piece 16 upward or downward. A hollow slot within the shifting piece 16 accommodates a portion of the clutch 12 thereby permitting engagement and disengagement. The transversely shifting piece 16 is retained in the engaged and disengaged positions by a locking mechanism 20. This locking mechanism 20 includes a spring that is compressed when the clutch 12 is disengaged from the shifting piece 16. Upward movement of the shifting piece 16 to allow engagement of clutch 12 causes expansion of the spring of the locking mechanism. A slot within the shifting piece 16 accepts a portion of the expanded spring for such latching.

A controlling bevelled surface 21 is formed on the transverse entraining pin 13. When the transversely shifting piece 16 is moved to the disengaged position and the operating spindle 8 is rotated by the hand crank 11, the bolt 15 of the clutch 12 is urged away from the positioning surface 18. Then the transverse entraining pin 13 is no longer prevented from being cammed downward by the operating spindle 8 through pressure by the controlling bevelled surface.

FIG. 3 shows the position in which the transverse entraining pin 13 can be moved from the entraining pin recess 17 in this way.

It will be understood that each of the elements described above, or two or more together, may also find a useful application in other devices differing from the type of device described above.

The invention is thus not intended to be limited to the details provided above and it will be understood that various omissions, modifications, substitutions and changes in the forms and details of the device illustrated and in its operation can be made by those skilled in the art without departing in any way from the spirit of the present invention.

I claim:

1. A vise comprising:

a stationary jaw;

a movable jaw displaceable longitudinally toward and away from the stationary jaw;

a nut fixed on the stationary jaw;

an outer hollow high-speed spindle threaded in the nut and formed with a radially open entrainment recess;

an inner low-speed spindle threaded in the outer spindle;

a piston-and-cylinder unit on the movable jaw having primary and secondary pistons respectively engaged by the outer and inner spindles;

a hand crank rotationally fixed on the inner spindle;

an entrainment pin displaceable transversely in the inner spindle between an entrainment position engaged in the recess and rotationally coupling the inner and outer spindles to each other and a freeing position clear of the recess and permitting relative rotation of the inner and outer spindles, the entrainment pin being formed with a longitudinally directed camming surface;

a switching piece displaceable on the inner spindle between a high-speed position and a low-speed position;

means including an operating bolt displaceable along the inner spindle and engageable with the entrainment pin and with the switching piece for pressing the operating bolt into the camming surface in the low-speed position of the switching piece and thereby pulling the entrainment pin out of the recess to decouple the spindles and for freeing the operating bolt from the camming surface and coupling the spindles to each other in the high-speed position of the switching piece.

2. The vise defined in claim 1 wherein the entrainment pin is formed with an angled bevel longitudinally engageable with the high-speed outer spindle for urging the pin radially out of the recess.

3. The vise defined in claim 1, further comprising latch means for releasably holding the switching piece in the high- and low-speed positions.

4. The vise defined in claim 1 wherein the operating bolt is displaceable longitudinally in the inner spindle and the latching piece is displaceable transversely thereon.

5. The vise defined in claim 4, further comprising a spring urging the operating bolt longitudinally against the camming surface.

6. The vise defined in claim 1 wherein the secondary piston is longitudinally displaceable in the primary piston.

* * * * *